United States Patent [19]

Ahrendt et al.

[11] 4,333,761
[45] Jun. 8, 1982

[54] METHOD FOR DIRECT REDUCTION OF IRON USING HIGH SULFUR GAS

[75] Inventors: William A. Ahrendt; Donald Beggs, both of Charlotte, N.C.

[73] Assignee: Midrex Corporation, Charlotte, N.C.

[21] Appl. No.: 215,782

[22] Filed: Dec. 12, 1980

Related U.S. Application Data

[62] Division of Ser. No. 86,980, Oct. 22, 1979, Pat. No. 4,270,739.

[51] Int. Cl.$^3$ .............................................. C21B 13/02
[52] U.S. Cl. ............................................ 75/35; 75/91; 266/156
[58] Field of Search ................................ 75/35, 34, 91

[56] References Cited

U.S. PATENT DOCUMENTS 3,749,386  7/1973  Beggs et al. .................. 75/35 X
4,032,120  6/1977  Beggs ............................. 75/35

Primary Examiner—M. J. Andrews
Attorney, Agent, or Firm—Ralph H. Dougherty

[57] ABSTRACT

A method for the direct reduction of iron oxide utilizing sulfur-containing gas such as coke oven gas for the process gas. Sulfur-containing gas is heated and injected into a shaft furnace above the reduction zone into a prereduction and sulfur transfer zone for transferring sufficient sulfur from the process gas to the burden, that the catalyst for reforming the spent top gas will not be poisoned.

7 Claims, 1 Drawing Figure

U.S. Patent   Jun. 8, 1982   4,333,761
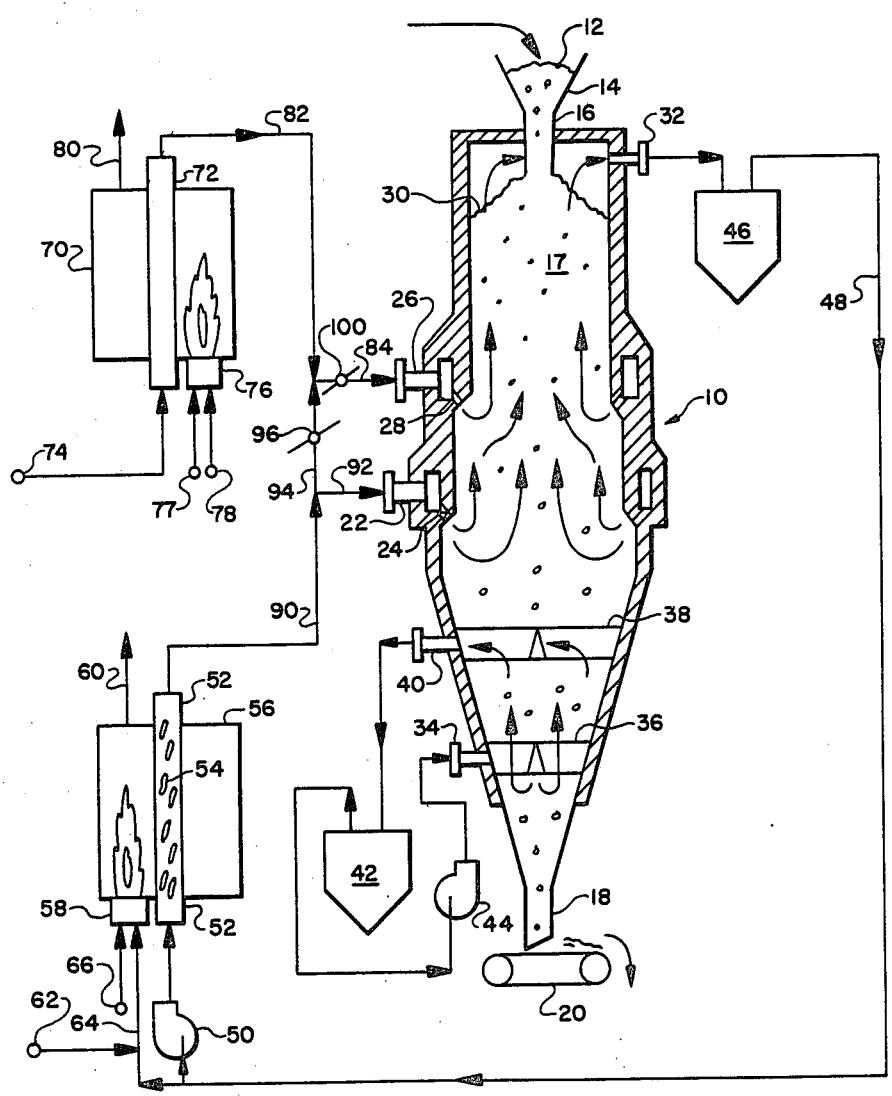

METHOD FOR DIRECT REDUCTION OF IRON USING HIGH SULFUR GAS

This is a division of application Ser. No. 086,980, filed Oct. 22, 1979, now U.S. Pat. No. 4,270,739 issued June 2, 1981.

BACKGROUND OF THE INVENTION

The direct reduction of iron oxide, in such forms as agglomerated pellets or lump ore, to metallic iron in the solid state has in recent years become a commercial reality in many direct reduction plants throughout the world. The combined annual capacity of these plants currently in operation or under construction is in excess of 15 million metric tons of direct reduced iron product, which is used primarily as feedstock for electric arc steelmaking furnaces. The world demand for additional direct reduced iron is projected to increase at a substantial rate for many years to satisfy a growing world need for such feedstock, as additional electric arc furnace steelmaking plants are constructed.

The majority of the commercial plants producing direct reduced iron utilize natural gas as the source of reductant. The natural gas is reformed to produce the reductants CO and $H_2$. The most energy efficient and most productive of the commercial natural gas based direct reduction plants are the Midrex plants which include continuous catalytic reforming of natural gas using as reforming oxidants the $CO_2$ and residual water vapor in cooled, recycled, spent reducing gas from the reduction furnace, as taught in U.S. Pat. No. 3,748,120.

In the catalytic reforming of natural gas or other hydrocarbon-containing gases, it is essential to maintain a very low level of sulfur in the gas mixture being reformed, as is well recognized in the art of catalytic reforming, in order to avoid sulfur poisoning of the catalyst. The maximum sulfur level which can be tolerated in the reforming, in order to avoid catalyst poisoning, is approximately 2 to 3 parts per million by volume (ppmv) in the mixture being reformed. To achieve this very low level of sulfur often requires complicated and expensive desulfurization of the gas before it can be utilized as process fuel.

Coke oven gas is available as a fuel in many of the industrial countries of the world. However, coke oven gas includes certain sulfur containing components such as COS and thiophene.

BRIEF SUMMARY OF THE INVENTION

In the present invention, which is an improvement to the direct reduction process taught in U.S. Pat. No. 3,748,120, the process fuel is desulfurized in the reduction furnace in a novel and useful manner by reacting the sulfur in the process fuel with hot direct reduced iron before the process fuel is admitted to the reformer. In effect, the sulfur in the process fuel is transferred to the iron during the reduction process, permitting sulfur levels as high as 400 ppmv in the process fuel to be tolerated without adding an undesirable amount of sulfur to the direct reduced iron product. This in-situ desulfurization of the process fuel makes practical, in the direct reduction of iron, the use of process fuels which are very difficult to desulfurize externally, such as coke oven gas or natural gas which contains organic sulfur compounds.

British Pat. No. 1,522,929 teaches a shaft furnace in which reducing gas is introduced at two vertically separated levels of introduction, one of which is around the periphery of the furnace, the other of which, being lower, is central of the furnace. In the present application we introduce reducing gas at two vertically separated levels, but the reducing gas at each level has a different composition. In addition, both gases are introduced at different temperatures and both are introduced around the periphery of the shaft furnace.

OBJECTS OF THE INVENTION

It is the primary object of this invention to provide means for desulfurization of gaseous process fuel used for direct reduction of iron by reacting sulfur present in the fuel with hot partially reduced iron during the reduction process.

It is another object of the invention to provide a highly efficient process for the direct reduction of iron utilizing reforming of hydrocarbon-containing gaseous process fuel to produce reducing gas, in which the process fuel is desulfurized in the reduction process prior to being reformed.

It is also an object of the invention to provide a direct reduction process which is particularly well adapted for the use of gaseous process fuels which contain organic sulfur.

BRIEF DESCRIPTION OF THE DRAWING

The single FIGURE is a diagrammatic illustration of the preferred embodiment of the invention.

DETAILED DESCRIPTION

Referring now to the drawing, a refractory-lined counterflow shaft type reduction furnace is indicated generally at 10. Iron oxide feed material 12, in the form of oxide pellets, natural lump ore, or a mixture of pellets and lump ore having a nominal particle size in the range of 5 to 30 mm, is introduced to a feed hopper 14 and into the furnace through a feed pipe 16 to establish a burden 17 within the furnace. Particulate direct reduced iron product is withdrawn from the lower region of the furnace through a furnace discharge pipe 18 by a discharge conveyor 20, the speed of which controls the rate of descent of the burden 17 through furnace 10.

The middle region of furnace 10 is provided with a hot reducing gas inlet pipe 22 leading to a plurality of gas inlet ports 24 arranged in the furnace refractory wall. A hot prereducing gas inlet pipe 26 is provided leading to a plurality of gas inlet ports 28 arranged in the furnace refractory wall at an elevation above ports 24. Hot pre-reducing gas, which consists of a mixture of hot reformed reducing gas and hot process fuel gas, introduced through ports 28 flows inwardly, then upwardly in counterflow relationship to the descending burden. Hot reducing gas introduced through ports 24 also flows inwardly, then upwardly in counterflow relationship to the descending burden. The hot reducing gas from ports 24, in its upward flow, initially fills the entire cross-section of the burden and then is forced to converge toward the center region of the burden at about the elevation of ports 28 due to the flow of hot pre-reducing gas through ports 28. In the upper region of the furnace the two gas streams merge and fill the entire cross-section of the burden and exit the burden at stockline 30 and leave the furnace through top gas outlet pipe 32. The top gas which leaves the furnace through outlet pipe 32 is a mixture of spent reducing gas and process fuel gas.

The lower region of furnace 10 is provided with a cooling gas circuit for cooling the direct reduced iron prior to discharge. This cooling circuit includes a cooling gas inlet 34 leading to a cooling gas distributing member 36 within furnace 10, a cooling gas collecting member 38 positioned above the distributing member within the furnace, a cooling gas outlet 40, and an external gas recirculating system having a cooler-scrubber 42 and a recirculating blower 44.

Top gas leaving furnace 10 through outlet pipe 32 is cooled and scrubbed of dust in a cooler-scrubber 46 and withdrawn into pipe 48. The major portion of the cooled top gas in pipe 48 is compressed in a compressor 50 and then admitted to a plurality of heat resisting alloy reformer tubes 52, one of which is shown in the drawing. Each reformer tube 52 is filled with refractory lump at the tube entry region and the remaining major portion is filled with nickel or cobalt reforming catalyst indicated generally as 54. The reformer tubes are enclosed in a refractory lined reformer furnace 56 having a plurality of burners 58, one of which is shown, and a flue pipe 60 for venting the spent burner combustion gases from the reformer furnace. A minor portion of cooled top gas in pipe 48 together with fuel from an external source 62 is admitted to each burner through pipe 64. The spent burner combustion gases in flue pipe 60 are utilized in a heat exchanger, not shown, to preheat combustion air for each burner from a source 66.

A process fuel gas heater 70, equipped with a plurality of heat resisting alloy heater tubes 72, one of which is shown, is provided for heating process fuel gas from a source 74. Heat is supplied to the heater by a plurality of burners 76, one of which is shown to which burner fuel is admitted from a source 77 and combustion air from a source 78. Spent burner combustion gases leave the heater through a flue pipe 80. Heated process fuel gas is admitted to reduction furnace 10 via pipes 82 and 84 and pre-reducing gas inlet 26.

The first, usually the major, portion of the hot gas leaving reformer tubes 52 is delivered to the hot reducing gas inlet 22, as the hot reformed reducing gas, via pipes 90 and 92. A second, usually minor, portion of the hot gas leaving reformer tubes 52 passes through pipe 94 and valve 96, then is mixed with heated process fuel gas in pipe 84 and this mixture becomes the hot prereducing gas admitted to furnace 10 at inlet 26.

The temperature of the process gas must be at least about 600° C., but is preferred to be above 650° C. The process gas must be heated to a sufficiently high temperature that a mixture of process gas and heated removed top gas will have a sufficiently high temperature to carry out the direct reduction of iron oxide.

In its broadest concept the invented process includes the complete mixing of the sulfur-containing process gas, such as coke oven gas, natural gas or blast furnace gas, with the hot reformed reducing gas to form a reducing gas mixture. This mixture is then introduced to the reducing zone of the furnace through a single bustle and tuyere system. This process can be performed with the apparatus shown in the drawing merely by the closing of valve 100 in pipe 84.

In the art of desulfurization of fuel gases such as natural gas, blast furnace gas or coke oven gas, there are numerous well established commercial processes for removing $H_2S$ (hydrogen sulfide) from such gases in a single desulfurization step. However, the removal of COS (carbonyl sulfide) and organic sulfur compounds such as thiophene ($C_4H_4S$) require the use of complicated and expensive multi-stage desulfurization processes to hydrogenate and convert the sulfur compounds to $H_2S$ before these forms of sulfur can be removed.

By laboratory experimentation, we have discovered that COS and organic sulfur compounds can be removed from gases by reaction with hot direct reduced iron pellets in the presence of hydrogen. The direct reduced iron is not effective at low temperatures for removal of these sulfur compounds, but is effective at temperatures of about 700° C. and higher. The exact mechanism of this sulfur removal is not known to us, but we believe the hot direct reduced iron becomes an effective catalyst for conversion of these sulfur compounds in the presence of hydrogen, to $H_2S$, which then chemically reacts with the iron. In any event, the sulfur is transferred from the gas to the direct reduced iron.

Therefore the gas mixture introduced to inlet 26 must be above about 700° C. for sulfur removal. Higher temperatures are usually preferred, however, as at least about 800° C. is needed for direct reduction of the iron oxide. Some pellets cluster at 800° C., so they must be reduced at lower temperatures. A practical lower limit for the temperature of the gas to inlet 22 is thus 750° C.

The following is a specific example of the present invention, utilizing sulfur-containing coke oven gas as the process fuel gas, and for the burner fuel for both the reformer furnace and the process fuel gas heater. The sulfur level selected for the coke oven gas in this example is 200 ppmv which is a sulfur level commonly achieved by simple single step desulfurization processes. Gas with this level of sulfur, although unuseable as a process fuel for reforming, is very acceptable as a burner fuel.

In the specific example of this invention, and referring to the drawing, hot reducing gas from the reformer tube 52 is admitted to the reduction furnace at inlet 22 at a temperature of about 900° C. Hot pre-reducing gas, which is a mixture of 900° C. gas from the reformer tubes and 750° C. coke oven gas from heater tubes 72, is admitted to the reduction furnace at inlet 26 at a temperature of about 800° C. The reduction furnace design provides for a furnace burden residence time of about 4 hours from the stockline 30 to ports 28 and 6 hours from stockline 30 to ports 24, which insures that a high degree of direct reduction of the iron oxide to metallic iron is achieved in the pre-reduction zone above ports 28, with the final degree of direct reduction being achieved in the reduction zone between ports 24 and ports 28.

In the pre-reduction zone, the reductants CO and $H_2$ in the hot pre-reducing gas and in the hot reducing gas flowing up from the final reduction zone reduce the iron oxide feed material to a degree of metallization of about 94 percent. Based upon both laboratory tests and commercial experience, the methane present in the pre-reduction gas from the coke oven gas does not crack to any significant degree in its passage through the pre-reduction zone at 800° C. because hydrogen is already present in the gas. Thus, the spent reducing gas or top gas exiting from the furnace burden at the stockline and from the furnace gas outlet pipe 32 contains unreacted reductants CO and $H_2$, oxidants $CO_2$ and $H_2O$ vapor formed in the reduction process, and methane. In the top gas cooler-scrubber 46, a major portion of the $H_2O$ vapor is condensed out of the top gas, resulting in a gas mixture suitable for reforming in reformer tubes 52 to produce hot fresh reducing gas. In the reformer tubes, the $CO_2$ and residual water vapor in the cooled and scrubbed top gas serve as the reforming oxidants for the methane, as is set forth in U.S. Pat. No. 3,748,120.

The following table show the results of a comprehensive process analysis of the invented process and are keyed to the drawing. These data are to be understood as being merely illustrative and in no way limiting. All of the tabulations are based on one metric ton of direct reduced iron product, having a degree of metallization of 92 percent and a carbon content of 1.5 percent. These are widely accepted commercial standards for direct reduced iron produced in natural gas based direct reduction plants.

Table I shows the fuel input required for the process. Coke oven gas has a higher heating value of 4618 kCal/Nm³.

TABLE I

|  | Fuel Input |
|---|---|
| Process Gas | 2.82 Gcal |
| Reformer Burners | 0.07 |
| Heater Burners | 0.32 |
| Total Fuel Requirement | 3.21 Gcal |

Table II shows the gas flows in the process in normal cubic meters per hour at the indicated locations on the drawing.

TABLE II

| Gas | Location | Flow Rate |
|---|---|---|
| From Reformer | 90 | 1320 |
| To Lower Inlets | 92 | 922 |
| Reformed Gas to Upper Inlets | 94 | 398 |
| Heated Process Gas | 82 | 609 |
| Gas Mixture To Upper Inlets | 84 | 1007 |
| Reacted Top Gas | 32 | 1901 |
| Recycle Gas | 48 | 1525 |
| Gas Feed To Reformer | 52 | 1085 |
| Recycle Gas to Reformer Burner | 64 | 440 |

Table III shows the gas analyses in percent at the locations indicated.

TABLE III

| Gas | Location | CO | $CO_2$ | $H_2$ |
|---|---|---|---|---|
| Reformed Gas | 90 | 32.9 | 2.5 | 51.5 |
| Process Fuel | 82 | 6.8 | 1.8 | 54.3 |
| To Upper Inlets | 84 | 17.1 | 2.1 | 53.2 |
| Top Gas | 32 | 13.4 | 12.4 | 34.3 |
| Cleaned Recycle Gas | 48 | 16.7 | 15.5 | 42.7 |

| Gas | $H_2O$ | $CH_4$ | $N_2$ | Sulfur (ppm) |
|---|---|---|---|---|
| Reformed Gas | 5.1 | 1.9 | 6.2 |  |
| Process Fuel | 3.0 | 28.7 | 5.4 | 200 |
| To Upper Inlets | 3.8 | 18.1 | 5.7 | 121 |
| Top Gas | 23.4 | 10.5 | 6.0 |  |
| Cleaned Recycle Gas | 4.5 | 13.1 | 7.5 |  |

Approximately 0.018 percent sulfur is added to the metallized iron product by the sulfur transfer from the process fuel gas. This is below the acceptable limit of 0.03 percent for use of direct reduced iron in electric arc furnace steelmaking.

In the present invention, when natural gas rather than coke oven gas is utilized as the process fuel gas, the required volumetric quantity of the natural gas will be approximately one-half that of coke oven gas due to the almost twice calorific value of the natural gas. This will enable the natural gas to contain approximately 400 ppmv of sulfur without adding an excessive amount of sulfur to the iron product.

Process fuel gases such as coke oven gas and naphtha vapor contain unsaturated hydrocarbons which can present carbon deposition problems in catalytic reforming. The present process, in addition to desulfurizing the process fuel gas, also serves to convert such unsaturated hydrocarbons into methane or other saturated hydrocarbon in the reduction furnace prior to the reforming and thus avoids carbon deposition problems during reforming.

It can readily be seen from the foregoing, that we have invented an improved process for the direct reduction of iron which will allow the direct use of sulfur-containing process fuel gases.

What is claimed is:

1. A method of reducing iron oxide to metallized iron comprising:
   (a) establishing a gravitational flow of particulate iron oxide material through a generally vertical shaft furnace by charging such material to the upper portion of said shaft furnace and removing metallized iron product from the bottom of said furnace;
   (b) selecting a sulfur-containing process gas from the group comprising coke oven gas, natural gas and blast furnace gas;
   (c) heating said process gas to a temperature of at least 600° C.;
   (d) mixing said heated process gas with hot reformed reducing gas to form a hot reducing gas mixture;
   (e) introducing said reducing gas mixture to said gravitational flow of material in said shaft furnace intermediate the ends of said furnace;
   (f) causing said reducing gas mixture to flow countercurrently through said gravitational flow of material desulfurizing the reducing gas, reducing the iron oxide material to metallized iron and forming a low sulfur top gas;
   (g) removing said top gas from said furnace, cooling and scrubbing said removed top gas; and
   (h) heating said removed top gas in the presence of a catalyst to form said hot reformed reducing gas, whereby the sulfur content of said removed top gas is too low to poison the catalyst.

2. A method according to claim 1 wherein said reducing gas mixture is introduced to said furnace at a temperature of at least about 700° C.

3. A method according to claim 1 wherein said removed top gas is heated to a temperature of at least about 750° C.

4. A method of reducing iron oxide to metallized iron comprising:
   (a) establishing a gravitational flow of particulate iron oxide material by charging such material to the upper portion of a generally vertical shaft furnace having an upper pre-reducing zone, an intermediate reducing zone and a lower cooling zone, and removing metallized iron product from the bottom of said furnace;
   (b) introducing a first reducing gas to said gravitational flow of material at the bottom of said pre-reducing zone;
   (c) introducing a second reducing gas to said gravitational flow of material at the bottom of said reducing zone;
   (d) causing said first and second reducing gases to flow countercurrently through said gravitational flow of material, desulfurize said first reducing gas, reduce the iron oxide in said material, and form a top gas;

(e) removing said top gas from said furnace, cooling and scrubbing top gas;
(f) reforming said top gas to reformed reducing gas by heating said cooled, cleaned, top gas in the presence of a catalyst;
(g) introducing a first portion of said reformed gas to said gravitational flow of material as said second reducing gas;
(h) heating a sulfur-containing process gas selected from the group comprising coke oven gas, natural gas and blast furnace gas;
(i) mixing a second portion of said reformed gas with said process gas to form said first reducing gas; and
(j) whereby said first reducing gas is desulfurized within said shaft furnace to a sufficient extent to prevent poisoning of said catalyst.

5. A method according to claim 4 wherein said first reducing gas is introduced to said pre-reducing zone at a temperature of at least about 700° C.

6. A method according to claim 4 wherein said process gas is heated to a temperature of at least about 600° C.

7. A method according to claim 4 wherein said second reducing gas is introduced to said reducing zone at a temperature of at least about 750° C.

* * * * *